United States Patent Office 3,254,719
Patented June 7, 1966

3,254,719
METHOD FOR DECREASING FRICTION LOSS IN A WELL FRACTURING PROCESS
Roland L. Root, Houston, Tex., assignor to The Dow Chemical Company, Midland, Mich., a corporation of Delaware
No Drawing. Filed Aug. 4, 1964, Ser. No. 387,507
8 Claims. (Cl. 166—42)

This application is a continuation-in-part of my copending application, Serial No. 65,016, filed October 26, 1960.

This invention relates to a well fracturing, and more particularly, to a method of fracturing wells whereby the pressure drop or friction loss due to the injection of the fracturing fluid in the well is reduced.

It is well known that in movement of fluids, friction is encountered and thus energy must be expended to overcome it. Since fluids are most conveniently moved by pumping, this loss is generally apparent from the pressure drop obtained in moving the fluids through a given distance. The pressure drop is approximately proportional to the square root of the velocity of the fluid. Thus, in an operation where a high velocity is required, such as in fracturing of oil and gas wells, extremely high pressure drops are encountered, resulting in a loss of a large amount of energy to pump or move the fluid. In fracturing earth formations penetrated by a well it is essential to inject a sufficient amount of the fracturing fluid to build up the required pressure in the well to produce cracks or fractures in the earth formation. Pressures as high as 3,000 to 10,000 pounds per square inch (measured at the surface) are often required to effect the required fracturing. Certain seepage of the fluid being pumped into the well is obtained so that it is necessary to inject the fluid into the well at high velocities to obtain the required pressure build-up. Even though fluid loss additaments are added to the fracturing fluids to limit seepage, the fluid loss is sufficient so that wells which are to be fractured are generally completed using larger size casing than would otherwise be used. When the normal sized casing is used, the capacity of the existing fracturing equipment is not sufficient to inject the required amount of the fluid into the well at a rate to obtain satisfactory results in many wells due to friction loss obtained as a result of fluid flow. Thus, a method whereby the friction loss due to the injection of the fluid in the well can be decreased is greatly desirable.

A number of additaments are generally added to fracturing fluids to change the physical properties of the fluid or to serve a certain beneficial function. Generally a propping agent, such as sand or other hard material, is added which will serve in the formation as a propping agent to keep the fractures propped open after the fracturing operation. Also, fluid loss agents are added to partially seal off the more porous sections of the earth formation so that the fracturing would result in the less porous strata. Often an agent is added to increase the viscosity so that the propping agent may be dispersed within the fluid during the injection and more easily carried. In addition to the above, corrosion inhibitors, foam inhibitors, brines and the like may also be used. The composition of the fracturing fluid is generally adjusted as required depending upon the particular well or formation to be fractured. For example, in fracturing in a certain formation it may be desirable to use a high concentration of the propping agent, while in another formation or well, very little or no propping agent may be desired. In each situation, the additaments used and the amounts are controlled depending upon the formation and the result desired. Thus, it is desirable in adding agents to the fracturing fluid to have an agent which will contribute a certain factor to the fracturing fluid without appreciably altering other characteristics of the fluid. This simplified the control of the fluid. Thus, it is very desirable to have an additament which will reduce the pressure drop due to fluid flow without materially affecting the other properties of the fluid.

Therefore, it is an object of this invention to provide a method of fracturing wells whereby the pressure drop due to fluid flow within the conduit is materially decreased.

The above and other objects are attained according to this invention by the addition to the fracturing fluid of from 0.005 to 4 weight percent, preferably from 0.02 up to 0.1 weight percent, of a polymer selected from the group consisting of acrylamide polymers having a molecular weight such that a 0.5 weight percent solution of the polymer in a 4 weight percent sodium chloride aqueous solution has an Ostwald viscosity in the range of 8 to 60 centipoises at 25° C. and long-chain polymers of ethylene oxide having a molecular weight in the range of 1 to 10 million, and injecting the fluid into the well to effect the fracturing. By the addition of the above polymer a reduction in pressure drop, due to the fluid flow, of over 80 percent may be obtained. When the above additament is added to the fracturing fluid in amounts of less than one-tenth of one percent, the reduction in friction loss is obtained without appreciably changing the viscosity of the fluid. Thus, the above additives when used in small percentages may be used to control reduction in friction loss without having a material effect on the other properties of the fluid.

The polymers which may be used in accordance with the invention as additaments to reduce fluid friction are obtained by polymerizing acrylamide with or without suitable comonomers, to prepare essentially linear acrylamide polymers. Usually this polymerization is conducted under the influence of a chemical polymerization catalyst, such as benzoyl peroxide. These acrylamide polymers are water-soluble. In the instance of polyacrylamide, the polymer may be used as obtained after polymerization or the polyacrylamide may be partially hydrolyzed by the reaction thereof with a sufficient amount of a base, such as sodium hydroxide, to hydrolyze a portion of the amide groups present in the polymer molecule. When such polymers are partially hydrolyzed, they are more effective. Optimum results are obtained with a polyacrylamide which has been partially hydrolyzed to the extent that from 20 to 40 percent of the available amide groups are hydrolyzed. Also, only the high molecular weight polymers as specified above, are effective. The viscosity of a given weight percent solution of the acrylamide polymer in a solvent such as sodium chloride aqueous solution is indicative of the molecular weight of the polymer. The polymers which are effective have a molecular weight such that a 0.5 weight percent solution of the polymer in a 4 weight percent aqueous sodium chloride solution has a viscosity measured by an Ostwald viscosimeter in the range of from 8 to 60 centipoises, at 25° C., preferably in the range of 15 to 40 centipoises.

Other acrylamide polymers useful herein include copolymers of acrylamide with other monoethylenically unsaturated monomers copolymerized therewith, which copolymers are water-soluble and meet the above test of molecular weight. Illustrative copolymers are those obtained by the ethylenic polymerization of acrylamide with up to a major proportion e.g., 50 mole percent or so, of one or more, other water-soluble comonomers such as acrylic acid, methacrylic acid, the alkali metal, amine and ammonium salts of acrylic and methacrylic acids, methacrylamide, β-aminoethyl acrylate, β-aminoethyl methacrylate, N-methyl-β-aminoethyl acrylate, N-methyl aminoethyl methacrylate, N,N-dimethyl β-aminoethyl methacrylate, and the water-soluble N-alkyl substituted acrylamide and methacrylamides such as N-isopropyl acrylamide. Still other comonomers of the water-soluble class are the alkali metal styrene sulfonates, and alkali metal vinylbenzoates. Also useful are allyl alcohol, N-vinyl pyridine, N-vinyl pyrrolidone, and N-vinyl-2-oxazolidone. If desired, water-insoluble monomers can also be copolymerized with acrylamide to provide acrylamide polymers useful herein. To maintain the necessary water solubility, such copolymers will usually contain no more than about 25 mole percent of the water-insoluble co-monomer. Illustrative of such comonomers are styrene, vinyl chloride, vinylidene chloride methylmethacrylate, and methacrylonitrile.

The ethylene oxide polymers which are effective are the long-chain polymers which are characterized by minimum of cross-linkages and high molecular weight. Such ethylene oxide polymer having a molecular weight in the range of from 1 to 10 million are generally used, those having a molecular weight in the range of 3 to 8 being preferred.

Although as little as 0.005 weight percent of the polymer may be added to obtain the reduction in friction loss, it is generally preferred to use from 0.02 to 0.1 weight percent. As used herein, the specified "weight percent" of polymer is based on the total weight of the fracturing fluid. The preferred amount to use is generally about 2 to 10 pounds of the polymer per thousand gallons of the fracturing mixture being used. At concentrations below about 0.005 weight percent very little reduction in friction loss is obtained. The amount added, however, may be appreciably increased. A reduction in pressure drop is still obtained, even though the amount added may be up to about 4 weight percent. No additional benefit in reduction of pressure drop is obtained when the amount is increased above about 0.1 weight percent but at times it may be desirable to add appreciably more to increase the viscosity of the fluid. Thus, if it is desirable to also increase the viscosity of the fracturing fluid, the amount of the polymer added may be as high as 4 percent or approximately 300 lbs. per thousand gallons of fracturing fluid.

The additament may be used in most aqueous solutions normally used in fracturing in which the polymers are soluble. Generally the other additives, such as corrosion inhibitors, foam inhibitors, natural brines and the like, do not adversely affect the additament.

To obtain the benefit of the additament, it is necessary that the flow be in turbulent condition and at a high velocity. At low velocities the pressure drop is not as critical as at the higher velocities, and the saving, if any obtained, is for practical purposes negligible. In oil well fracturing, for example, the fracturing fluid is generally pumped in lines which are from about 2 to 4 inches in diameter. With lines of this size a velocity in the range of 5 to 80 feet per second or higher may be employed. Most often the velocity is about 10 feet per second or greater. At these velocities the pressure drop due to friction is large and the additament is effective in decreasing this loss.

The following examples will further illustrate the invention.

*Example 1*

To further illustrate the invention, a series of runs was made where different amounts of a polyacrylamide polymer were added to water and to water containing sand and pumped through a test apparatus. The pressure drops obtained in pumping the different mixtures through the apparatus were compared to the pressure drop obtained when only water was used. The polymer had a molecular weight such that a 0.5 weight percent solution of a polymer in 4 weight percent sodium chloride aqueous solution had an Ostwald viscosity of 28 centipoises.

The test apparatus consisted of a pumping unit used in oil well fracturing having its discharge outlet connected to a test section of 2 inch oil field tubing (4.7 pounds EUE). Pressure measurements were made at the inlet and outlet of a test section of the pipe. The test section was 1070 feet long. Pressure measurements were taken electrically and checked by use of a Bourdon tube type gauge and a standard pressure recorder.

In running the test, approximately 3,000 gallons of the fluid were prepared in a blending tank. This fluid was pumped from the blending tank through the test section and then returned to the tank to be again recycled. The rates at which the fluid was pumped were varied and the pressure drop obtained in the test section recorded.

The pertinent data and results obtained are shown in the table below:

| Run | Fluid Pumped | Additament | Amount of Additament added to Fluid | | Pumping Rate, barrels/min. | Velocity of Fluid in Tubing, feet/sec. | Pressure Drop in 1,070' of Tubing, p.s.i. |
|---|---|---|---|---|---|---|---|
| | | | Lbs./1,000 gal. | Wt. Percent | | | |
| Blank a | Water | None | | | 4.8 | 20.8 | 309 |
| Blank b | ----do---- | ----do---- | | | 5.8 | 25.2 | 425 |
| Blank c | ----do---- | ----do---- | | | 7.2 | 31.2 | 615 |
| 1 | ----do---- | Polyacrylamide polymer, 30 percent hydrolyzed by reaction with sodium hydroxide. | 1.8 | 0.022 | 6.6 | 28.7 | 142 |
| 2 | ----do---- | ----do---- | 1.8 | 0.022 | 9.2 | 40 | 258 |
| 3 | ----do---- | ----do---- | 1.8 | 0.022 | 11.7 | 51 | 440 |
| 4 | ----do---- | ----do---- | 10.8 | 0.13 | 6.8 | 29.5 | 122 |
| 6 | ----do---- | ----do---- | 10.8 | 0.13 | 9.2 | 40 | 211 |
| 7 | ----do---- | ----do---- | 10.8 | 0.13 | 12.9 | 56 | 388 |
| 8 | Water to which 4 lbs. sand per gal. were added. | ----do---- | 10.8 | 0.13 | 7.0 | 30.4 | 185 |
| 9 | ----do---- | ----do---- | 10.8 | 0.13 | 9.1 | 39.5 | 270 |
| 10 | ----do---- | ----do---- | 10.8 | 0.13 | 12.4 | 54.0 | 409 |

*Example 2*

A test was made in an actual well fracturing wherein the fracturing fluid was pumped into the well with a conventional injection pump to fracture the formation and the injection rates were determined both with and without the friction loss additament. In the injection 2½ inch oil field tubing was used and the fracturing fluid contained approximately 2 pounds of 20–40 mesh sand per gallon of the fracturing fluid. The breakdown pressure of the formation was in the range of 4800 p.s.i. to 2800 p.s.i. The total horsepower available for driving the injection pump was 1920. Upon injection of water alone a breakthrough was obtained at approximately 4800 p.s.i. and to obtain an injection rate of 10 barrels per minute, 6700 lbs. p.s.i. was required. The water was injected for a total of about 3 minutes at this high pressure and then pump suction was switched to a fracturing fluid to which was added 11.3 lbs. per thousand gallons of a polyacrylamide polymer. The polymer had a molecular weight such that a 0.5 weight percent solution of the polymer in a 4 weight percent sodium chloride solution had an Ostwald viscosity of 28 centipoises at 25° C. The injection rate immediately increased to 15.6 barrels per minute and the pressure required to obtain this injection dropped to 5000 lbs. p.s.i. This injection continued for about 20 minutes after which flushing water was injected. Upon the injection of the flushing water the injection rate immediately decreased and the pressure increased. After about 5 minutes the rate had decreased to 10 barrels per minute and the pressure had increased to 6700 lbs. p.s.i. or approximately the same value prior to the injection of fracturing fluid to which the additament had been added.

*Example 3*

To illustrate the reduction in pressure loss obtained, water containing the additament in accordance with the invention was pumped through pipes of different sizes at various velocities. The pressure drop obtained was compared to the pressure drop obtained when water was pumped through the apparatus without the additament.

The apparatus used comprised a 55 gallon tank in which the water was stored. From the storage tank the water was pumped by means of a positive displacement pump to a test section of pipe and then returned to the storage tank. The pressure drop was determined by measuring the pressure at the entrance and discharge ends of the test section by means of test gauges. Three different sized steel pipes, schedule 40, were used, viz. a ⅜ inch, a ½ inch and a 1 inch pipe. The length of the test section of the different sizes of pipe varied. For the ⅜ inch pipe the test section was 7 feet long. For the ½ inch pipe the test section was 11.42 feet, while for the 1 inch pipe, it was 10.44 feet.

The polyacrylamide polymer used had a molecular weight such that a 0.5 weight percent solution of the polymer in a 4 weight percent sodium chloride aqueous solution had a viscosity of 28 centipoises at 25° C. measured by an Ostwald viscosimeter and about 30 percent of the amide groups were hydrolyzed. The ethylene oxide polymer had an average molecular weight of about 7 million.

The pertinent data and results are shown in the table below.

viscosity in the range of 8 to 60 centipoises at 25° C., and injecting the resulting mixture in the well.

2. A process according to claim 1 wherein the acrylamide polymer is added to the fracturing fluid in an amount from 0.02 to 0.1 weight percent.

3. A process according to claim 1 wherein the acrylamide polymer is a polyacrylamide hydrolyzed to the extent that from 20 to 40 percent of the amide groups present in the polymer molecules are hydrolyzed and has a molecular weight such that a 0.5 weight percent solution of the polymer in sodium chloride solution has a viscosity in the range of 15 to 40 centipoises at 25° C.

4. In a process of fracturing an earth formation penetrated by a well wherein an aqueous fluid is pumped into the well at a velocity of at least 10 feet per second to cause fracturing of the formation, the improvement of reducing the pressure drop sustained in the pumping of the fluid due to fluid friction, which comprises adding from 0.005 to 0.1 weight percent of an acrylamide polymer having a molecular weight such that a 0.5 weight percent solution of the polymer in a 4 weight percent aqueous sodium chloride solution has a viscosity in the range of 8 to 60 centipoises at 25° C., and injecting the fluid into the well.

5. A process according to claim 4 wherein the acrylamide polymer is a polyacrylamide hydrolyzed to the extent that from 20 to 40 percent of the amide groups present in the polymer molecules are hydrolyzed.

6. A process according to claim 5 wherein the polymer has a molecular weight such that a 0.5 weight percent solution of the polymer is a 4 weight percent aqueous sodium chloride solution has a viscosity of from 15 to 40 centipoises at 25° C.

7. In the process of fracturing an earth formation penetrated by a well, wherein an aqueous fracturing fluid containing a propping agent is injected through the well into the earth formation at high velocity to cause fracturing of the formation; the improvement of decreasing the friction loss in the flow of the aqueous fracturing fluid which comprises adding thereto from 0.005 to 0.1 weight percent of an acrylamide polymer having a molecular weight such that a 0.5 weight percent solution of the polymer in a 4 weight percent aqueous sodium chloride solution has a viscosity within the range of 8 to 60 centipoises at 25° C.

8. In the process of fracturing an earth formation penetrated by a well, wherein an aqueous fracturing fluid containing a propping agent is injected through the well into the earth formation at high velocity to cause fracturing

| Run | Pipe Size, in. | Flow Rate gal./min. | Velocity, ft./sec. | Pressure Drop with no Additament, p.s.i. | Pressure Drop With Additament, p.s.i. | | | | | | |
|---|---|---|---|---|---|---|---|---|---|---|---|
| | | | | | Polyacrylamide, lbs./1,000 gal. | | | | Ethylene Oxide, lbs./1,000 gal. | | |
| | | | | | .5 | 1 | 2 | 10 | 2 | 10 | 20 |
| 1 | ⅜ | 5 | 8.4 | 5.7 | 2.0 | 1.4 | 1.2 | 2.4 | 3.5 | 2.3 | 2.2 |
| 2 | ⅜ | 10 | 16.9 | 21.5 | 5.7 | 4.1 | 3.5 | 6.5 | 8.4 | 5.2 | 5.3 |
| 3 | ⅜ | 20 | 33.7 | 80.0 | 23.5 | 13.8 | 10.5 | 16.8 | 22.8 | 12.8 | 13.8 |
| 4 | ⅜ | 30 | 50.6 | 175.0 | 63 | 34.0 | 23 | 27.0 | 49.0 | 24.0 | 26.5 |
| 5 | ½ | 10 | 10.6 | 5.3 | 1.8 | 1.4 | 1.2 | 2.0 | 3.3 | 2.3 | 2.3 |
| 6 | ½ | 15 | 15.8 | 11.7 | 3.6 | 2.6 | 2.3 | 3.2 | 5.3 | 3.7 | 3.8 |
| 7 | ½ | 25 | 26.4 | 32.5 | 9.5 | 6.4 | 5.4 | 6.3 | 12.3 | 7.3 | 7.6 |
| 8 | ½ | 40 | 42.3 | 80.0 | 24.8 | 15.2 | 12.8 | 11.0 | 27.0 | 15.9 | 18.2 |
| 9 | 1 | 15 | 5.6 | 0.76 | 0.4 | 0.2 | 0.3 | 0.8 | 0.6 | 0.5 | 0.6 |
| 10 | 1 | 25 | 9.3 | 2.0 | 0.8 | 0.6 | 0.6 | 1.2 | 1.5 | 1.1 | 1.1 |
| 11 | 1 | 40 | 14.9 | 5.0 | 1.6 | 1.3 | 1.2 | 2.0 | 3.7 | 2.0 | 1.8 |

What is claimed is:

1. In the process of fracturing an earth formation penetrated by a well, wherein an aqueous fracturing fluid is injected through the well into the earth formation at a high velocity to cause fracturing of the formation, the improvement of decreasing the friction loss in the flow of the aqueous fracturing fluid which comprises, adding to the fracturing fluid from 0.005 to 0.1 weight percent of an acrylamide polymer having a molecular weight such that a 0.5 weight percent solution of the polymer in a 4 weight percent aqueous sodium chloride solution has a of the formation; the improvement of decreasing the friction loss in the flow of the aqueous fracturing fluid which comprises adding thereto from 0.005 to 0.1 weight percent of polyacrylamide having from 20 to 40 percent of the amide groups present in the polymer molecules hydrolyzed, said polymer having a molecular weight such that a 0.5 weight percent solution of the polymer in a 4 weight percent aqueous sodium chloride solution has a viscosity within the range of 8 to 60 centipoises at 25° C.

(References on following page)

References Cited by the Examiner

UNITED STATES PATENTS

| | | | |
|---|---|---|---|
| 3,024,191 | 3/1962 | Jones | 166—42.1 |
| 3,039,529 | 6/1962 | McKennon | 166—42 |
| 3,116,791 | 1/1964 | Sandiford et al. | 166—9 |
| 3,163,212 | 12/1964 | Bernard | 166—9 |

FOREIGN PATENTS 617,132   3/1961   Canada.

JACOB L. NACKENOFF, *Primary Examiner.*

CHARLES E. O'CONNELL, T. A. ZALENSKI,
*Examiners.*